US011128501B2

(12) United States Patent
Lan et al.

(10) Patent No.: US 11,128,501 B2
(45) Date of Patent: Sep. 21, 2021

(54) METHOD FOR FAST CONVERGENCE CALIBRATION OF RADIO-FREQUENCY TRANSCEIVERS

(75) Inventors: Tim Lan, Sunnyvale, CA (US); Sheng Lin, Milpitas, CA (US); Lekun Lin, Milpitas, CA (US)

(73) Assignee: Huwomobility, Inc., Milpitas, CA (US)

(*) Notice: Subject to any disclaimer, the term of this patent is extended or adjusted under 35 U.S.C. 154(b) by 1336 days.

(21) Appl. No.: 11/830,569

(22) Filed: Jul. 30, 2007

(65) Prior Publication Data
US 2009/0034651 A1 Feb. 5, 2009

(51) Int. Cl.
*H04L 27/00* (2006.01)
*H04L 27/26* (2006.01)
*H04L 25/06* (2006.01)
*H04L 27/36* (2006.01)
*H04L 27/38* (2006.01)

(52) U.S. Cl.
CPC ........ *H04L 27/2601* (2013.01); *H04L 25/061* (2013.01); *H04L 27/364* (2013.01); *H04L 27/3863* (2013.01)

(58) Field of Classification Search
CPC .................................................. H04L 27/2601
USPC .................................. 375/219, 221, 226, 259
See application file for complete search history.

(56) References Cited

U.S. PATENT DOCUMENTS

| | | | | |
|---|---|---|---|---|
| 5,452,473 A | * | 9/1995 | Weiland et al. | 455/88 |
| 5,973,643 A | * | 10/1999 | Hawkes | G01S 1/045 |
| | | | | 342/457 |
| 7,092,454 B2 | * | 8/2006 | Dinur | 375/298 |
| 7,310,387 B2 | * | 12/2007 | Kim et al. | 375/316 |
| 2003/0231723 A1 | * | 12/2003 | Hansen | 375/343 |
| 2004/0082302 A1 | * | 4/2004 | Shippee | 455/127.1 |
| 2004/0106380 A1 | * | 6/2004 | Vassiliou | H04B 17/20 |
| | | | | 455/73 |
| 2005/0047384 A1 | * | 3/2005 | Wax et al. | 370/338 |
| 2005/0156662 A1 | * | 7/2005 | Raghupathy et al. | 330/10 |
| 2005/0157815 A1 | * | 7/2005 | Kim | H03D 3/008 |
| | | | | 375/302 |
| 2005/0200507 A1 | * | 9/2005 | Premy et al. | 341/120 |

* cited by examiner

*Primary Examiner* — Qutbuddin Ghulamali
(74) *Attorney, Agent, or Firm* — Huwomobility, Inc.

(57) ABSTRACT

To more efficiently compensate for modulation imbalance, a mobile device modulates and demodulates a calibration tone and generates digital data representing modulation imbalance effects on the calibration tone. Using digital data enables modulation imbalance effects to be quickly estimated using digital signal processing techniques, increasing the number of estimates of modulation imbalance effects calculated. The modulation imbalance estimates are used to refine one or more compensation parameters which are applied to transmitted and/or received signals to compensate for errors caused by modulation.

20 Claims, 6 Drawing Sheets

METHOD FOR FAST CONVERGENCE CALIBRATION OF RADIO-FREQUENCY TRANSCEIVERS

BACKGROUND

1. Field of Art

The present invention generally relates to the field of modulation in wireless communication systems, and more specifically, to compensating for modulation imbalance in wireless communication systems using digital techniques.

2. Description of the Related Art

Many communication systems transmit information by varying characteristics of a carrier signal according to properties of a data stream. Thus, changes in carrier signal characteristics correspond to different portions of the data stream. This carrier modulation allows for more robust data transmission. One commonly used modulation scheme is orthogonal frequency-division multiplexing (OFDM). ODFM divides the data stream to be transmitted into several parallel data streams, each containing less data than the original stream. The available transmission frequency spectrum is then divided into several sub-channels with each lower-data stream transmitted using a conventional modulation scheme such as phase-shift-keying (PSK), binary phase-shift-keying (BPSK) or quadrature amplitude modulation (QAM) to modulate each sub-channel.

OFDM is widely used in modern communication systems because it does not require complex filters to compensate for sub-optimal channel conditions, such as multipath interference or narrowband interference. This has resulted in widespread use of OFDM in wideband digital communication systems such as asynchronous digital subscriber line (ADSL) networks or networks compliant with the IEEE 802.11a/b standard, the IEEE 802.16 standard or the IEEE 802.20 standard.

However, errors in the modulation process can significantly degrade performance of any modulation technique, including OFDM. Errors in modulation create imbalances between the in-phase component and quadrature component of the modulated signal. This in-phase and quadrature (I/Q) imbalance creates amplitude and phase mismatches between the components of the modulated signal, causing data transmission errors.

Existing approaches use the analog domain to compensate for I/Q imbalance. However, analog compensation methods do not efficiently, or completely, compensate for I/Q imbalance. Further, these analog compensation methods are computationally intensive, often requiring direct solving of multiple linear equations, depend on channel conditions and decision errors and require complex circuitry for implementation.

Thus, there is a need for an approach to I/Q imbalance compensation that reduces the amount of computation, the decision error dependence and implementation circuitry.

SUMMARY

Various embodiments of the invention allow wireless communication systems to use digital techniques to compensate I/Q modulation imbalance. Since wireless communication systems commonly use in-phase and quadrature (I/Q) modulation to maximize spectral use, efficiently compensating for imbalances in I/Q modulation improves performance of wireless communication systems and reduces wireless transceiver cost. To achieve this I/Q modulation imbalance compensation, digital processing techniques and a calibration tone are used to approximate multiple I/Q imbalance values and compute correction terms. In this way, multiple approximations of I/Q imbalance effects are computed and used to more accurately compensate for the imbalance.

In one implementation, an analog calibration signal is received and digital data representing the analog calibration signal is generated. The generated digital data is used to generate parameters, such as DC offset, in-phase and quadrature power difference, in-phase and quadrature correlation, arrival time, that represent modulation imbalance effects of the calibration signal. The parameters are used to generate I/Q compensation parameter(s), which compensates modulation imbalance in a transmitted or received signal.

In one implementation, a mobile communication device includes a transceiver, a power detector, a parameter generator and a compensation module. The transceiver receives an analog calibration tone which is used by the power detector to generate analog data. The generated analog data is converted into digital data by an analog-to-digital converter and the digital data is used to generate a modulation imbalance correction term. The compensation module uses the correction term to modify an estimate of the modulation imbalance and generate a modulation imbalance compensation parameter. Using digital data allows the parameter generator and compensation module to reduce computation time by using digital signal processing techniques, which can also improve the accuracy of the compensation parameter by allowing multiple modulation imbalance estimates to be computed.

Other aspects of the invention include devices that implement modulation imbalance compensation techniques such as those described above, components for these devices, and systems using these devices or techniques. Further aspects include methods and processes corresponding to all of the foregoing.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention. It is noted that wherever practicable similar or like reference numbers may be used in the figures and may indicate similar or like functionality.

Generally, the following examples allow use of digital processing techniques to compensate modulation imbalance effects in transmitted or received signals. For example, in one implementation, a calibration tone is received and used to generate digital data that is used to estimate and compensate for modulation imbalance. Using digital data reduces the computational efforts and implementation circuitry used to estimate modulation imbalance and generate one or more modulation imbalance compensation parameters. Further, the calibration tone used for compensation can be locally generated, which further reduces the computational overhead needed to compensate for modulation imbalance.

Figure 1:
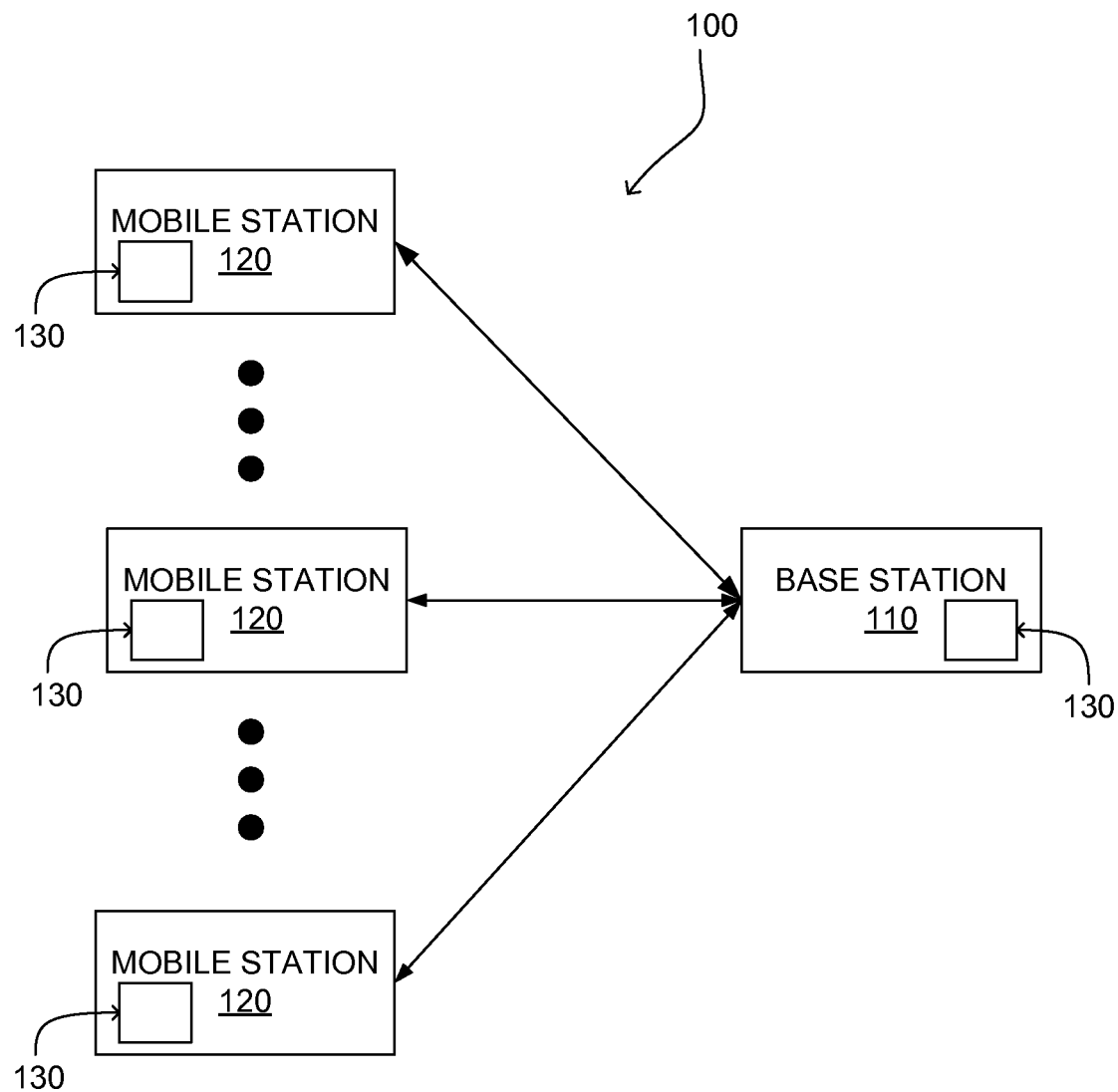
FIG. 1 is a block diagram of a data communication network suitable for use with the invention.

FIG. 1 shows a data communication network 100 suitable for use with the invention. The data communication network 100 includes a base station 110 and one or more mobile stations 120 (i.e., mobile communication devices). The base station 110 and mobile stations 120 include transceivers 130 for wirelessly transmitting and receiving data between the devices. In some applications, the data communication network 100 is a wireless network compliant with the IEEE 802.16 standard (e.g., WiMax, WiBro, etc.), the IEEE 802.11 standard or the IEEE 802.20 standard. Although described herein with respect to wireless communication systems, the convergence method described below is applicable to any system where a signal is converted from passband to baseband. For convenience, FIG. 1 shows transceivers 130 but devices 110 and 120 could be configured with only transmitters or only receivers if bidirectional communication is not required.

The data communication network 100 typically uses symbols to represent data to be transmitted and uses multicarrier modulation to transmit the symbols. For example, the data communication network 100 could transmit data symbols using orthogonal frequency-division multiplexing (OFDM), binary phase-shift keying (BPSK), or other modulation methods. Multicarrier modulation techniques, such as ODFM, divide the data stream to be transmitted into several parallel data streams, each containing less data than the original data stream. The available frequency spectrum is then divided into several sub-channels used to transmit each reduced data stream is using a modulation scheme such as BPSK, phase-shift-keying (PSK), quadrature amplitude modulation (QAM) or another suitable modulation technique to modulate each sub-channel.

For example, the data communication network 100 uses in-phase and quadrature (I/Q) modulation to create a modulated signal having an in-phase component and a quadrature component. The resulting modulated signal can be represented as:

$$y = x\cos(2\pi f_0 t) + jx[\sin(2\pi f_0 t)]$$

where:
$f_0$ = carrier frequency, and
x = data stream.

Errors in the modulation process create an amplitude imbalance and/or a phase mismatch between the real part and the imaginary part of the modulated signal. The presence of an amplitude imbalance and/or phase mismatch creates a distorted signal which can be represented as:

$$y = x\cos(2\pi f_0 t) + j\varepsilon x[\sin(2\pi f_0 t - \Delta\varphi)]$$

where:
$\varepsilon$ = amplitude imbalance, and
$\Delta\varphi$ = phase mismatch During demodulation, the amplitude imbalance and/or phase mismatch causes errors in the recovery of the modulated data.

The base station 110 and mobile station 120 include transceivers 130 for transmitting and receiving wireless communications signals that contain these data symbols. The transceiver 130 transmits wireless communication signals and receives wireless communication signals to be processed from other devices. In certain applications, the transceiver 130 includes an antenna capable of transmitting and receiving wireless signals, such as those compliant with the IEEE 802.16 standard, IEEE 802.11a/b/g standard or other wireless communication formats. However, the transceiver 130 can be any device capable of wirelessly transmitting and receiving signals. When transceiver 130 transmits or receives data, it also compensates for amplitude imbalance and/or phase mismatch to reduce transmission errors. Digital techniques simplify the radio frequency (RF) components of the transceiver 130 and allow more advanced signal processing techniques to be used to estimate and compensate modulation imbalance effects. A more detailed description of the structure of the transceiver 130 is provided in conjunction with FIG. 2.

Figure 2A:
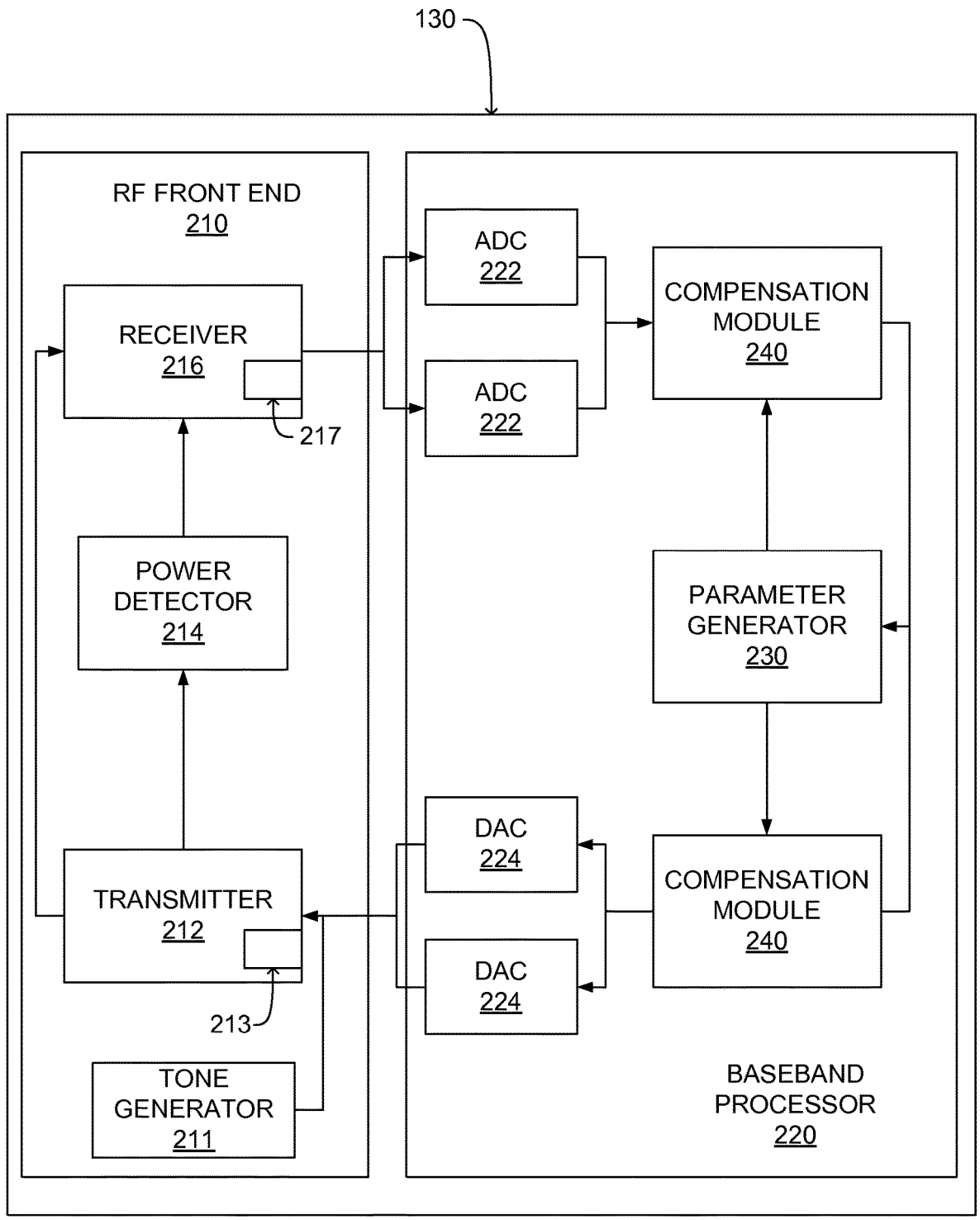
FIG. 2A is a block diagram of a transceiver according to one embodiment of the invention.

FIG. 2A shows a transceiver 130 which uses digital processing to compensate for modulation imbalance effects in accordance with an embodiment of the invention. In this example, the transceiver 130 includes an RF antenna (not shown in FIG. 2), an RF front end 210 and a baseband processor 220. The RF front end 210 includes a transmitter 212 for transmitting data to other devices using RF techniques such as those described in the IEEE 802.16, 802.11 or 802.20 standards. The transmitter 212 uses a modulator 213 to modulate a carrier signal responsive to the received input signal so that the carrier signal conveys the data included in the input signal. The modulator 213 groups the input signal into symbols, and uses the symbols to modify characteristics of the carrier signal, such as phase, frequency or amplitude. In an implementation, the modulator 213 uses conventional modulation techniques such as phase-shift keying (PSK), frequency-shift keying (FSK), orthogonal frequency-division multiplexing (OFDM), orthogonal frequency-division multiple access (OFDMA), or another suitable technique to alter the carrier signal responsive to different data symbols.

In one implementation, the RF front end 210 also includes a tone generator 211. The tone generator 211 creates a tone used to calibrate the transmitter 212 and/or the receiver 216. The tone generator 211 transmits the calibration tone to the power detector 214 and/or the receiver 216 using a data path that includes the transmitter 212. In different designs, the tone generator 211 comprises a software process and/or a firmware application structured to generate a repetitive waveform, such as a sinusoidal wave. The tone generator 211 can generate multiple sinusoidal waves having different frequencies within a specified range (e.g., from 20 Hz to 20 kHz). In one design, the tone generator 211 uses digital techniques to generate the calibration tone(s) and is located on the baseband processor 220 where a DAC 224 creates the analog calibration tone. In an alternate design, the tone generator 211 includes a DAC, allowing the tone generator 211 to use digital generation techniques while included in the RF front end 210. In one configuration, the tone generator 211 and the transmitter 212 are combined into a single module or component, so the single module generates the calibration tone and transmits data signals.

Additionally, the RF front end 210 includes a receiver 216 for receiving data from other devices using wireless communication techniques. The receiver includes a demodulator 217 which extracts data from a modulated signal by correlating changes in input signal characteristics, such as amplitude, phase and frequency, with data symbols. Depending on the type of modulation scheme, such as OFDM, OFDMA, PSK or other suitable scheme, the demodulator 217 performs different actions to separate data from the carrier signal.

The RF front end 210 also includes a power detector 214 comprising a perfect-square law device and a low-pass filter. In one design, the low-pass filter has a bandwith of the generated tone frequency plus a constant value; hence, the low-pass filter has a bandwidth greater than the bandwidth of the generated tone. For example, the power detector 214 bandwidth exceeds the tone bandwidth by a small constant amount. The perfect square law device and low-pass filter causes the power detector 214 to generate an output of two sinusoids having frequencies $f_{tone}$ and $(2)(f_{tone})$ when a sinusoid with frequency $f_{tone}$, an I/Q imbalance and a DC offset is received as input.

The transceiver 130 also includes a baseband processor 220 which processes data received by and/or data to be transmitted by the RF front end 210. The baseband processor 220 includes one or more analog-to-digital converters (ADCs) 220 which convert analog signals received by the receiver 217 to digital signals for subsequent processing. Additionally, the baseband processor 220 also includes digital to analog converters (DACs) to convert digital signals received by the baseband processor 220 into analog signals for transmission by the RF front end 210.

The baseband processor 220 also includes a parameter generator 230 and one or more compensation modules 240 which correct for errors in the modulation process. In one design, a single compensation module 240 is used to compensate for transmitter and receiver errors. Alternatively, two compensation modules 240 are used, with one compensating for transmitter errors and another compensating for receiver errors. The compensation module 240 applies the calculated parameters to the data signal to correct errors caused by modulation. In different designs, the parameter generator 230 is implemented in a variety of ways. During a calibration process the parameter generator 230 uses data from an applied calibration tone to generate correction terms that offset modulation imbalance and other modulation errors. The parameter generator 230 and/or compensation module 240 can be implemented in many ways. For example, they may be implemented as a software process and/or a firmware application structured to operate on a general purpose microprocessor or controller, a field programmable gate array (FPGA), an application specific integrated circuit (ASIC) or a combination thereof. In one implementation, the compensation module 240 includes the parameter generator 230 allowing a single module to compute the compensation parameters and apply the computation parameters to the data signal.

Figure 2B:
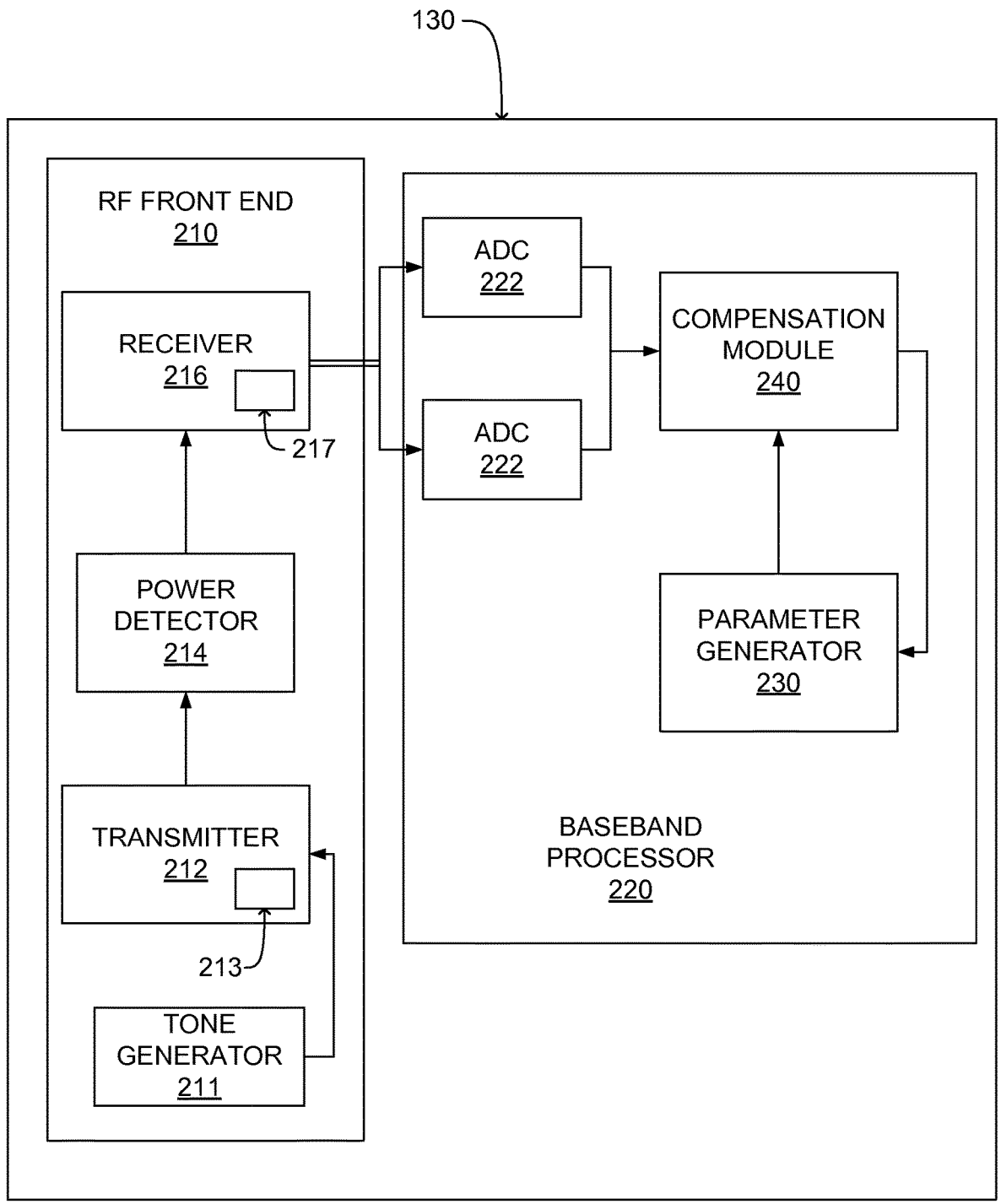
FIG. 2B is a block diagram of a data flow path for transmitter calibration according to one embodiment of the invention.

FIG. 2B is a block diagram of a data flow path for transmitter 212 calibration according to one embodiment of the invention. For purposes of illustration, FIG. 2B illustrates the components of the transceiver 130 used during transmitter 212 calibration.

A calibration tone generated by the tone generator 211 is applied to the transmitter 212 where the calibration tone is up-converted. The up-converted calibration tone is then applied to the power detector 214 which generates two component tones, one having the calibration tone frequency and the other having twice the calibration tone frequency. The component tones are then transmitted to the baseband processor 220 via the receiver 216. To prevent introduction of errors from demodulation, the receiver 216 operates in a loop-back mode where it acts as a signal path and does not modify the component tones.

At the baseband processor 220, the component tones are digitized using an ADC 222, and the digital data is transmitted to the parameter generator 230, where estimates of the transmitter I/Q modulation imbalance are generated and used to generate transmitter correction terms. In one design, multiple estimates of the transmitter I/Q modulation imbalance are computed and used to modify the transmitter correction terms, improving compensation accuracy. In one configuration, the compensation module 240 provides a data path from the ADC 220 to the parameter generator 230, so the calibration tone and previously generated transmitter compensation parameters are transmitted to the parameter generator 230. This allows the parameter generator 230 to modify previously computed transmitter compensation parameters responsive to data from the calibration tone.

Figure 2C:
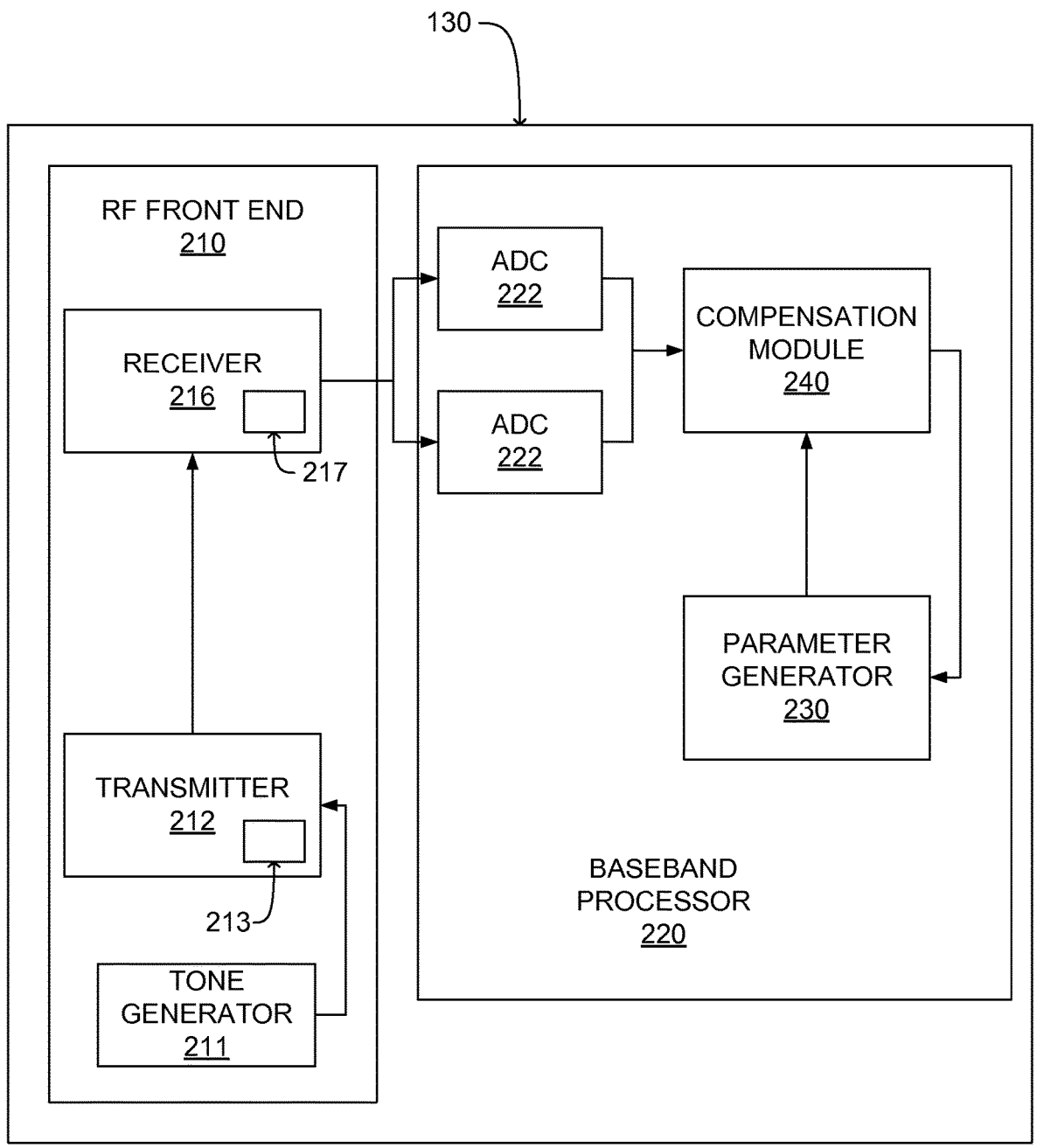
FIG. 2C is a block diagram of a data flow path for receiver calibration according to one embodiment of the invention.

FIG. 2C is a block diagram of a data flow path for receiver 216 calibration according to one embodiment of the invention. For purposes of illustration, FIG. 2B illustrates the components of the transceiver 130 used during receiver 216 calibration.

Initially, a calibration tone is generated by the tone generator 211 and applied to the transmitter 212. During the receiver 216 calibration, the transmitter 212 operates in a loop mode where it does not modulate the calibration tone. The un-modulated calibration tone is transmitter from the transmitter 212 to the receiver 216. Through down-conversion, the receiver 216 converts the calibration tone to a baseband signal having sine and cosine signals having the calibration tone frequencies. The sine and cosine terms of the baseband signal have different amplitudes and phases and can have different DC offsets. The baseband signal is then transmitted to the baseband processor 220 for computation of the receiver compensation parameters.

At the baseband processor 220, the component tones are digitized using an ADC 222, and the digital data is transmitted to the parameter generator 230, where estimates of the transmitter I/Q modulation imbalance are generated and used to generate receiver correction terms. In one design, multiple estimates of receiver I/Q modulation imbalance are computed and used to modify the correction terms, improving compensation accuracy. In one configuration, the compensation module 240 provides a data path from the ADC 220 to the parameter generator 230, so the calibration tone and previously generated receiver compensation parameters are transmitted to the parameter generator 230. This allows the parameter generator 230 to modify previously computed receiver compensation parameters responsive to data from the calibration tone.

Figure 3:
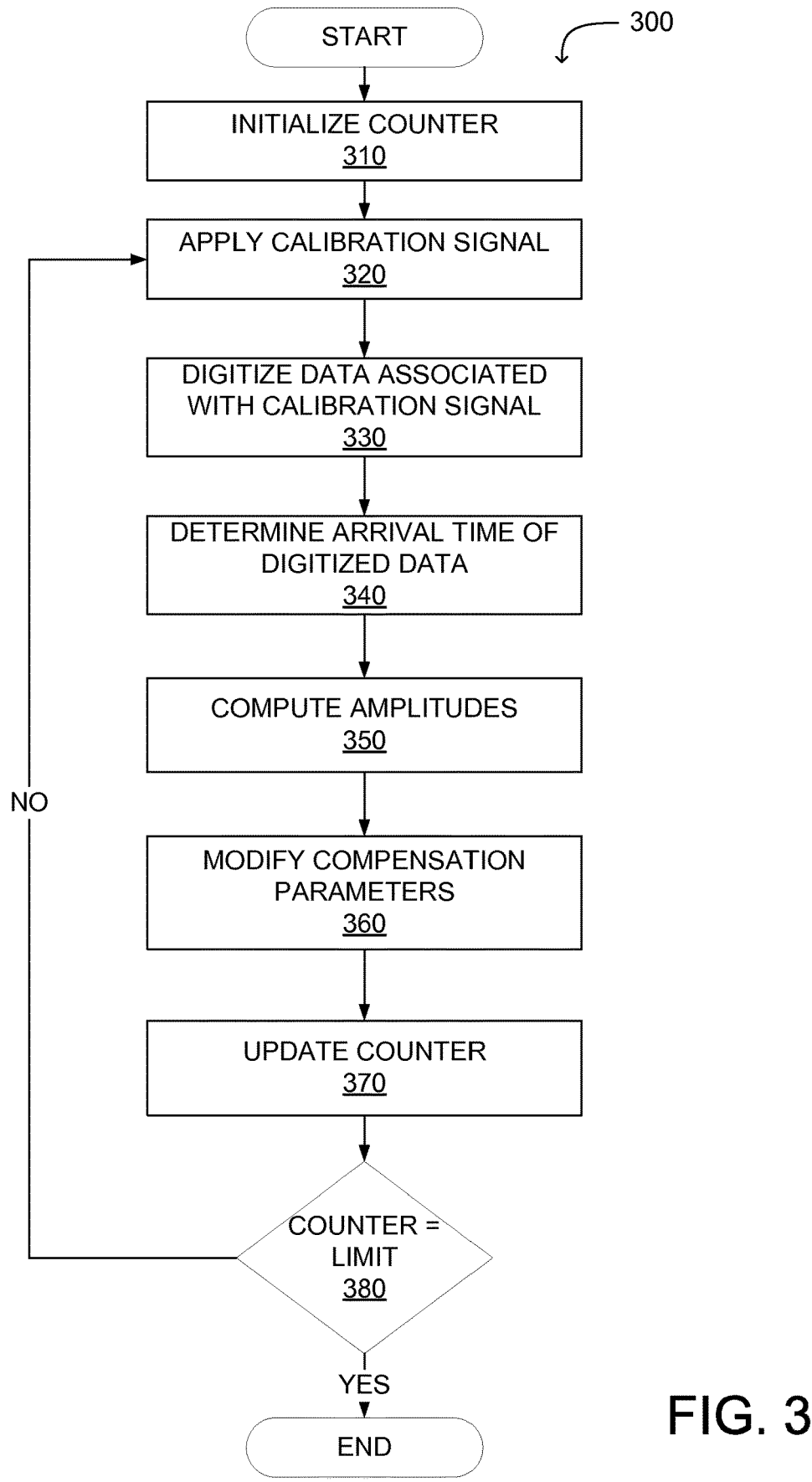
FIG. 3 is a flowchart of calibrating a transmitter to compensate for modulation imbalance according to one embodiment of the invention.

FIG. 3 shows a method for calibrating the transmitter 212 to compensate for modulation imbalance introduced by imperfections in the transmitter 212 according to an embodiment of the invention. In the example of FIG. 3, the transmitter 212 is calibrated before the transceiver 130 transmits or receives a wireless communication signal. The calibration occurs prior to a data exchange between a base station and a mobile station so that the I/Q imbalance parameters are recalculated to reflect changing system conditions. In an alternative implementation, the calibration occurs each time the transmitter 130 is powered-up to account for changes in imbalance effects during different data transfer sessions. Initially, a specified calibration signal is applied to the transmitter 212 and used to generate parameters that are then used to compensate modulation imbalance in subsequently transmitted wireless communication signals.

In one approach, the transmitter 212 computes a specified number of estimates of modulation imbalance effects and iteratively modifies the transmitter compensation parameters using each computed estimate. A counter is initialized 310 specifying a number of estimates of the transmitter modulation imbalance effects to compute. A calibration signal is applied 320 to the transmitter 212 and used to compute modulation imbalance effects. In an implementation, the calibration signal is a sinusoid having a defined frequency, $f_{tone}$. In one design, the calibration signal is locally generated by a tone generator 211 included in the RF front end 210 and applied 230 to the transmitter 212. In another implementation, the calibration tone is generated by a separate system or software process and is then applied 230 to the transmitter 212. The calibration tone frequency can be varied from implementation to implementation, allowing customized calibration of different devices. In an implementation, the calibration tone frequency can be modified by a user or a software/firmware process according to changing conditions. Alternatively, the calibration tone frequency can be a predefined specific frequency.

The applied calibration tone proceeds through the RF front end 210 to the power detector 214, which generates two tones with frequencies of $f_{tone}$ and $2f_{tone}$. DC offsets from the modulation of the calibration signal by the transmitter 212 generate the $f_{tone}$ component while I/Q imbalances from the modulation generate the $2f_{tone}$ component. As the power detector 214 comprises a perfect square law device and low-pass filter, two tones are generated when an input including a DC offset and an I/Q imbalance is received. The power detector 214 output is then routed through the receiver 216 to the baseband processor 220 where it is digitized 330 by an ADC 222. During the calibration process, the receiver 216 operates in a loop mode, where it does not demodulate received data, preventing introduction of demodulation errors from the receiver 216. Digitizing 330 allows the baseband processor 220 to use digital signal processing techniques to more efficiently estimate modulation imbalance effects.

The baseband processor 220 determines 340 the arrival time of the $f_{tone}$ and $2f_{tone}$ components of the calibration signal. In one configuration, the arrival time describes the phase offset introduced by the power detector 214 in producing the sinusoidal outputs. Because of the unknown delay between application of the calibration signal to the transmitter 212 and receipt of the calibration signal by the baseband processor 220, the baseband processor 220 correlates the received tone components with known patterns to estimate the arrival times of the $f_{tone}$ and $2f_{tone}$ components. In one configuration, the baseband processor 220 correlates the received power detector 214 outputs s with data locally stored in the baseband processor describing sinusoids having frequencies of $f_{tone}$ and $2f_{tone}$. Hence, a received tone, including a phase offset, is correlated with locally stored data describing a tone having the same frequency. In one configuration, the correlation method results in a peak when:

$$N(f_{tone}) = [(K(f_{tone}) + \theta) \bmod 2\pi]$$

where:
  N, K=are positive integers, and
  $\theta$=phase offset of the received sinusoid.

The estimated arrival times are then used to compute 350 the amplitudes of the real and complex components of the $f_{tone}$ and $2f_{tone}$ components of the power detector 214 output. In one design, the computed amplitudes comprise the results of the correlation between the locally stored tone and the received tone. The digitized signal from the power detector is correlated with stored data describing $f_{tone}$ and $2f_{tone}$ tones having similar arrival times. In one embodiment, the stored data used for correlation comprises a pre-computed table describing sinusoids having frequencies of $f_{tone}$ and $2f_{tone}$.

The computed amplitudes are then used to modify 360 one or more transmitter compensation parameters. In one implementation, the computed amplitudes are used to update previous estimates of IQ imbalances and DC offsets using a recursive algorithm. In an implementation, the computed amplitudes specify the amount the previously computed estimates are modified. For example, correction terms are computed for amplitude imbalance, phase mismatch, in-phase DC offset and quadrature DC offset according to the following algorithm:

$$G[k+1] = G[k] + (C_G)a_4$$

$$P[k+1] = P[k] - (C_P)a_3$$

$$DC_I[k+1] = DC_I[k] - (C_{DCI})a_2$$

$$DC_Q[k+1] = DC_Q[k] - (C_{DCQ})a_1$$

where:
  G=amplitude imbalance compensation value,
  $C_G$=gain adjustment increment,
  $a_4$=amplitude of $\cos[(2\pi)(2f_{tone})t]$,
  P=phase mismatch compensation value
  $C_P$=phase adjustment increment,
  $a_3$=amplitude of $\sin[(2\pi)(2f_{tone})t]$,
  $DC_I$=in-phase DC offset compensation value,
  $C_{DCI}$=in-phase DC offset adjustment increment,
  $a_2$=amplitude of $\cos[(2\pi f_{tone})t]$,
  $DC_Q$=quadrature DC offset compensation value,
  $C_{DCQ}$=quadrature DC offset adjustment increment,
  $a_4$=amplitude of $\sin[(2\pi f_{tone})t]$ In an implementation, the correction terms (e.g., G, P, DCI and DCQ) are initialized to zero, so that G[0]=P[0]=DCI[0]=DCQ[0]=0. Alternatively, the correction terms are initialized to a predefined value, or values, or to the final values computed in a prior calibration. Additionally, the offset adjustment increment is dependent on the frequency, $f_{tone}$, of the calibration signal used. In an implementation, the offset adjustment increments are predefined values while in other implementations, the offset adjustment increments are user-defined and can be individually modified. The modified transmitter compensation parameters are then transmitted to the compensation module 240 to correct for modulation errors introduced by the transmitter 212. In one design, the transmitter compensation parameters are used to pre-distort a data signal, prior to modulation, so that any modulation imbalance cancels out the pre-distortion. Alternatively, the compensation parameters are applied to a modulated data signal to cancel errors caused by the modulation process.

In an implementation, the compensation parameters are modified 360 a specified number of times during the calibration process, so the counter is updated 370 after each parameter modification. In a design, the counter is incremented until it reaches the specified value. Alternatively, the counter is decremented until it reaches zero. The updated counter is then compared 380 with a threshold to determine if further modifications to the compensation parameters are necessary. If the updated counter does not equal the threshold, the calibration signal is again applied 320 and the subsequent steps are performed to further modify the compensation parameters. If the updated counter equals the threshold, the transmitter 212 calibration ends and the compensation parameters are applied to subsequently transmitted wireless communication signals.

Figure 4:
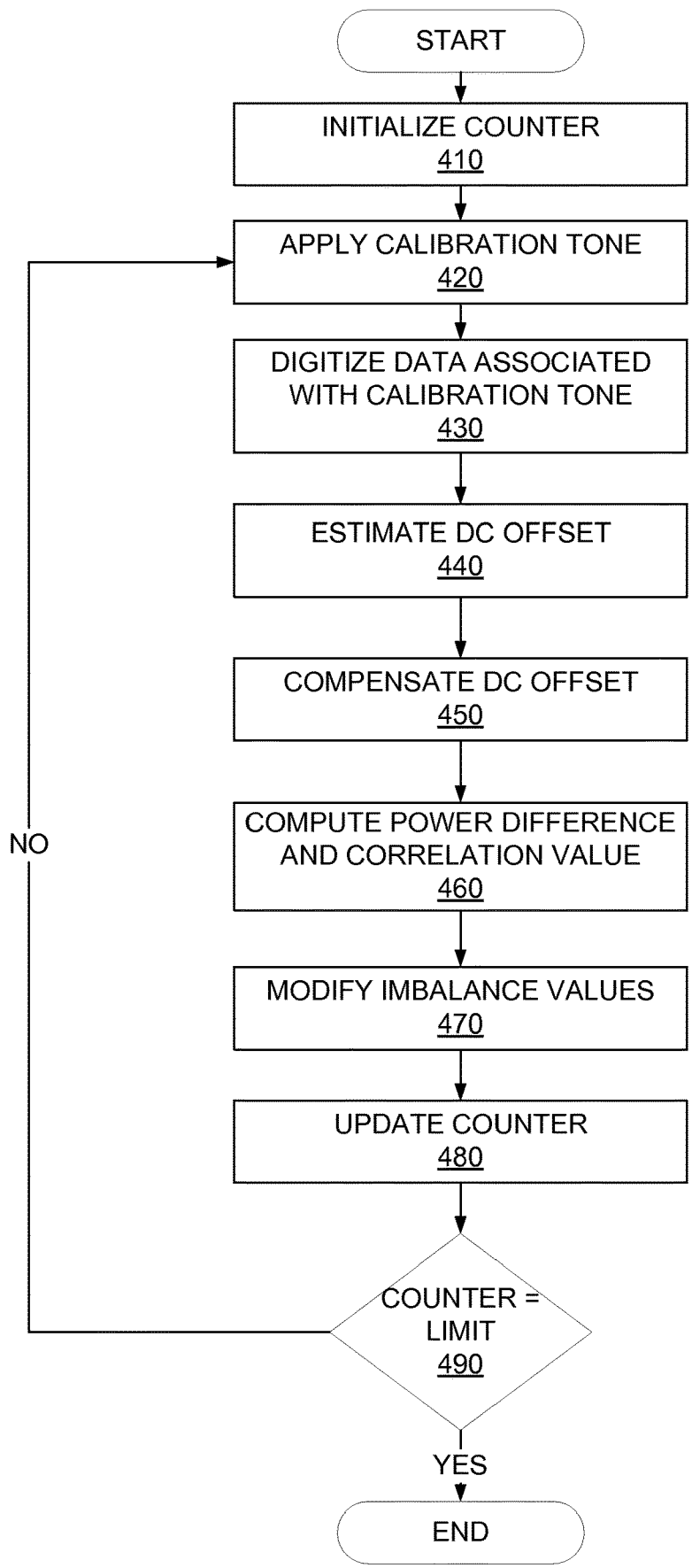
FIG. 4 is a flowchart of calibrating a receiver to compensate for modulation imbalance according to one embodiment of the invention.

FIG. 4 shows a method for calibrating the receiver 216 to compensate for modulation imbalance introduced by the receiver 216 according to an embodiment of the invention. In the example of FIG. 4, receiver 216 calibration occurs after transmitter 212 calibration, but prior to transmission or receipt of a wireless communication signal. The calibration occurs prior to a data exchange between a base station and a mobile station so that the I/Q imbalance parameters are recalculated to reflect changing system conditions. In an alternative implementation, the calibration occurs each time the transmitter 130 is powered-up to account for changes in imbalance effects during different data transfer sessions. In one configuration, the calibrated transmitter 212 transmits an un-modulated calibration tone to the receiver 216, as described above in conjunction with FIG. 2C, which generates parameters compensating for modulation imbalance using the calibration tone.

In one approach, a specified number of receiver modulation imbalance estimates are computed and adjusted responsive to each computed estimate. Initially, a counter specifying the number of receiver modulation imbalance estimates is initialized 410. A calibration tone, such as an un-modulated tone, is then applied 420 to the receiver 216, where the calibration tone is down-converted to produce a sine signal and cosine signal, each having frequency $f_{tone}$ but having different amplitudes, phases and DC offsets. The generated sine and cosine signals are digitized 430, such as by an ADC 222, and transmitted to the baseband processor 220.

Using the digitized data, the baseband processor 220 estimates 440 the DC offsets of the in-phase and quadrature components of the sine and cosine signals. In an implementation, the in-phase and quadrature DC components are averaged to estimate 440 the DC offsets of the components. The DC offsets are then compensated 450 by subtracting the estimated DC offsets from the received sine and cosine signals. For example, the in-phase estimated DC offset is subtracted from the in-phase component of the received signal to compensate for in-phase DC offset.

After compensating 450 for the DC offset, the baseband processor 220 computes 460 the power difference and correlation between the in-phase component and quadrature component of the DC compensated signals. The power difference and correlation are then used to modify 470 prior estimates of receiver modulation imbalance effects. In one implementation, the computed values are used by a recursive algorithm to alter previously determined receiver modulation imbalance estimates. In an implementation, the computed power difference and correlation determine the amount by which previously computed estimates are modified. For example, the computed values are used to generate amplitude imbalance and phase mismatch estimates using the following algorithm:

$$G[k+1]=G[k]-(C_G)[P_I-P_Q]$$

$$P[k+1]=P[k]+(C_P)\rho_{I,Q}$$

where:
G=gain imbalance estimation value,
$C_G$=gain adjustment increment,
$P_I$=power of in-phase component of received signal
$P_Q$=power of quadrature component of received signal
P=phase mismatch value
$C_P$=phase adjustment increment,
$\rho_{I,Q}$=correlation of in-phase and quadrature components of received signal In an implementation, the gain imbalance and phase mismatch values are initialized to zero, so that G[0]=P[0]=0. Alternatively, the values are initialized to a predefined value, or values, or to the values computed in a prior calibration. Additionally, the adjustment increment is dependent on the frequency, $f_{tone}$, of the calibration signal used. In an implementation, the offset adjustment increments are predefined while in other implementations, the increments are user-defined and can be individually modified. The modified compensation parameters are then transmitted to the compensation module 240 to correct modulation imbalance errors introduced by the receiver 216. By computing different parameters for gain imbalance compensation, phase imbalance compensation for transmitter and receiver, different step sizes can be used to compensate for imbalance errors in both the transmitter and receiver. For example, use of different step sizes when modifying imbalance mismatch and DC offset avoids oscillation when the imbalance mismatch estimates are computed.

In an implementation, the imbalance estimated values are modified 470 a specified number of times during calibration, so the counter is updated 480 after each modification. In one design, the counter is incremented until it reaches a specified value. Alternatively, the counter is decremented until it reaches zero. The updated counter is then compared 490 with a threshold to determine if compensation parameter modification continues. If the updated counter does not equal the threshold, the calibration signal is again applied 420 and the subsequent steps are again performed to modify the modulation imbalance error estimates. If the updated counter equals the threshold, the receiver 216 calibration ends and the compensation parameters are subsequently applied to received wireless communication signals. In one implementation, the receiver compensation parameters are used to pre-distort a received signal prior to demodulation by the receiver 216; thus, as the pre-distorted received signal is demodulated, imbalances in the demodulation offset the pre-distortion. Alternatively, the receiver compensation parameters are applied to a demodulated received signal to cancel errors caused by the demodulation process.

As used herein, "coupled" is intended to mean both coupled directly (without intervening elements) and coupled indirectly (with intervening elements). Upon reading this disclosure, those of skill in the art will appreciate still additional alternative structural and functional designs for a system and a method for estimating and compensating modulation imbalance through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A mobile communication device which digitally compensates for modulation imbalance effects, comprising:
    a transmitter for receiving an analog calibration tone;

a power detector adapted to communicate with the transmitter, the power detector for generating analog data representing the analog calibration tone;
an analog-to-digital converter (ADC) adapted to communicate with the power detector, the ADC for generating digital data representing the generated analog data;
a parameter generator adapted to communicate with a compensation module, the parameter generator for generating a correction term for modulation imbalance using the generated digital data; and
the compensation module adapted to communicate with the parameter generator, the compensation module for modifying an estimate of the modulation imbalance effects using the correction term and for generating a transmitter compensation parameter for the modulation imbalance effects using the modified estimate of the modulation imbalance,
wherein the parameter generator computes multiple estimates of the modulation imbalance to modify the correction term.

2. The mobile communication device of claim 1, further comprising:
a receiver adapted to communicate with the transmitter and the ADC, the receiver for receiving an un-modulated calibration tone from the transmitter and generating component signals from the un-modulated calibration tone;
wherein the ADC digitizes the component signals to generate digital component signal data and transmits the digital component data to the compensation module which generates a receiver correction term for the modulation imbalance effects using the digital component data.

3. The mobile communication device of claim 2, wherein the un-modulated calibration tone is a sinusoid with a defined frequency.

4. The mobile communication device of claim 1, further comprising:
a tone generator adapted to communicate with the transmitter, the tone generator for generating the calibration tone or the un-modulated calibration tone.

5. The mobile communication device of claim 4, wherein the transmitter includes the tone generator.

6. The mobile communication device of claim 1, further comprising:
a digital-to-analog converter (DAC) adapted to communicate with the compensation module and the transmitter, the DAC for generating analog data representing the transmitter correction term and for transmitting the analog representation of the transmitter correction term to the transmitter.

7. The mobile communication device of claim 1, wherein the mobile communication device is a handheld device.

8. The mobile communication device of claim 1, wherein the mobile communication device is a handheld mobile phone.

9. The mobile communication device of claim 1, wherein the calibration tone is a sinusoid with a defined frequency.

10. A method for compensating a modulation imbalance effect in a mobile communication device, comprising the steps of:
receiving an analog calibration signal;
generating digital data representing the analog calibration signal;
determining signal parameters of the generated digital data, wherein the parameters represent the modulation imbalance effect of the calibration signal;
generating a correction term for modulation imbalance using the generated digital data, wherein the generating of the correction term includes computing multiple estimates of the modulation imbalance to modify the correction term;
modifying an estimate of the modulation imbalance effects using the correction term; and
generating at least one compensation parameter for the modulation imbalance effects using the modified estimate of the modulation imbalance.

11. The method of claim 10, wherein the step of generating the at least one compensation parameter comprises the steps of:
generating a transmitter compensation parameter using at least a transmitter subset of the parameters, wherein the transmitter compensation parameter compensates a transmitter modulation imbalance effect introduced by modulation; and
generating a receiver compensation parameter using at least a receiver subset of the parameters, wherein the receiver compensation parameter compensates a receiver modulation imbalance effect introduced by demodulation.

12. The method of claim 10, wherein the step of generating the at least one compensation parameter comprises the steps of:
initializing the compensation parameter to a starting value;
generating a modified compensation parameter by modifying the starting value responsive to the signal parameters.

13. The method of claim 10, wherein the step of generating the at least one compensation parameter comprises the steps of:
initializing the at least one compensation parameter to a starting value;
modifying the starting value using the signal parameters;
generating a second set of signal parameters describing a second modulation imbalance effect on the calibration signal; and
generating an updated compensation parameter using the modified starting value and at least a subset of the second set of signal parameters.

14. The method of claim 10, wherein the signal parameters are selected from a group consisting of: an in-phase complex amplitude, a quadrature complex amplitude, an in-phase real amplitude, a quadrature real amplitude, a power difference between an in-phase component and a quadrature component, a correlation between the in-phase component and the quadrature component, a DC offset of the in-phase component and a DC offset of the quadrature component.

15. The method of claim 10, wherein the step of generating the at least one compensation parameter comprises the steps of:
determining an arrival time of components of the calibration signal; and
computing an amplitude of at least one component of the calibration signal.

16. The method of claim 15, wherein the step of determining the arrival time of components comprises the step of: correlating a received component of the calibration signal with a predefined pattern.

17. The method of claim 15, wherein the step of computing an amplitude of at least one component comprises the step of:

correlating a component of the calibration signal with stored data describing a signal having the determined arrival time.

18. The method of claim 10, wherein the step of generating the at least one compensation parameter comprises the steps of:
generating an average DC quadrature offset for the generated digital data;
generating a average DC in-phase offset for the generated digital data; and
modifying the generated digital data using at least one of the average DC quadrature offset and the average DC in-phase offset.

19. The method of claim 18, further comprising the steps of:
generating a power difference between an in-phase component of the modified digital data and a quadrature component of the modified digital data;
generating a correlation between the in-phase component of the modified digital data and the quadrature component of the modified digital data; and
generating an amplitude mismatch estimate or a phase mismatch estimate using at least one of the power difference and the correlation.

20. A transceiver for a mobile communication device, comprising:
a radio-frequency (RF) transceiver for transmitting and receiving wireless communication signals and generating a calibration signal; and
a baseband processor adapted to communicate with the RF transceiver, the baseband processor comprising:
an analog to digital converter (ADC) for generating digital data representing the generated calibration signal;
a parameter generator adapted to communicate with a compensation module, the parameter generator for generating a correction term for modulation imbalance using the generated digital data; and
the compensation module adapted to communicate with the parameter generator, the compensation module for modifying an estimate of the modulation imbalance using the correction term and for generating a compensation parameter for the modulation imbalance using the modified estimate of the modulation imbalance,
wherein the parameter generator computes multiple estimates of the modulation imbalance to modify the correction term.

* * * * *